United States Patent
Ha et al.

(10) Patent No.: US 12,188,774 B2
(45) Date of Patent: Jan. 7, 2025

(54) METHOD AND APPARATUS FOR PROVIDING MULTI-MODAL SERVICE USING A PERSONAL MOBILITY VEHICLE

(71) Applicants: HYUNDAI MOTOR COMPANY, Seoul (KR); KIA CORPORATION, Seoul (KR); KOOKMIN UNIVERSITY INDUSTRY ACADEMY COOPERATION FOUNDATION, Seoul (KR)

(72) Inventors: Jae Jun Ha, Hwaseong-si (KR); Gu Min Jeong, Seoul (KR); Hyun Jung Oh, Seoul (KR); Seung Hyeon Lee, Seoul (KR)

(73) Assignees: HYUNDAI MOTOR COMPANY, Seoul (KR); KIA CORPORATION, Seoul (KR); KOOKMIN UNIVERSITY INDUSTRY ACADEMY COOPERATION FOUNDATION, Seoul (KR)

( * ) Notice: Subject to any disclaimer, the term of this patent is extended or adjusted under 35 U.S.C. 154(b) by 249 days.

(21) Appl. No.: 17/404,615

(22) Filed: Aug. 17, 2021

(65) Prior Publication Data
US 2022/0057219 A1     Feb. 24, 2022

(30) Foreign Application Priority Data

Aug. 21, 2020   (KR) ........................ 10-2020-0105654
Apr. 23, 2021   (KR) ........................ 10-2021-0052735

(51) Int. Cl.
*G01C 21/34*     (2006.01)
*G01C 21/36*     (2006.01)
*G06Q 10/02*     (2012.01)

(52) U.S. Cl.
CPC ..... *G01C 21/3423* (2013.01); *G01C 21/3415* (2013.01); *G01C 21/3492* (2013.01); *G01C 21/3617* (2013.01); *G06Q 10/02* (2013.01)

(58) Field of Classification Search
CPC .......... G01S 5/14; G01S 5/0294; G01S 5/021; G01S 2205/01; G08G 1/096741; G08G 1/096783; G08G 1/0116; G08G 1/095; G08G 1/096716; H04B 17/318; H04B 17/27; H04B 17/104; H04W 4/44; H04W 4/40; H04W 4/029
See application file for complete search history.

(56) References Cited

U.S. PATENT DOCUMENTS

| | | | |
|---|---|---|---|
| 2006/0184314 A1* | 8/2006 | Couckuyt .......... | G01C 21/3423 340/995.19 |
| 2014/0188788 A1* | 7/2014 | Bridgen ................. | G06F 16/29 707/758 |
| 2016/0231129 A1* | 8/2016 | Erez .................... | G01C 21/3423 |

(Continued)

*Primary Examiner* — Stephen Holwerda
(74) *Attorney, Agent, or Firm* — Lempia Summerfield Katz LLC

(57) ABSTRACT

A method of operating an apparatus for providing a multi-modal service using a personal mobility vehicle includes: receiving a departure point and a destination from a user terminal; searching for positions of available PM vehicles between the departure point and the destination; generating a route between the departure point and the destination based on the positions of the PM vehicles; and providing the route and the positions of the PM vehicles to the user terminal.

12 Claims, 9 Drawing Sheets

(56) References Cited

U.S. PATENT DOCUMENTS

| | | | | |
|---|---|---|---|---|
| 2016/0298977 A1* | 10/2016 | Newlin | ............. | G01C 21/3679 |
| 2016/0313450 A1* | 10/2016 | Jordan | .................... | G01S 19/49 |
| 2018/0188731 A1* | 7/2018 | Matthiesen | ........ | G01C 21/3407 |
| 2018/0259351 A1* | 9/2018 | Broyles | ................... | H04W 4/02 |
| 2020/0175632 A1* | 6/2020 | Vora | ................ | G06Q 10/06315 |

\* cited by examiner

METHOD AND APPARATUS FOR PROVIDING MULTI-MODAL SERVICE USING A PERSONAL MOBILITY VEHICLE

CROSS-REFERENCE TO RELATED APPLICATION

This application is based on, and claims priority to, Korean Patent Application Number 10-2020-0105654 filed on Aug. 21, 2020 and Korean Patent Application Number 10-2021-0052735 filed on Apr. 23, 2021, the disclosures of which are incorporated by reference herein in their entirety.

TECHNICAL FIELD

The present disclosure provides a method and an apparatus for linking a personal mobility vehicle (PM vehicle) sharing service with other transportation means. More particularly, the present disclosure is related to a method and an apparatus for providing a multi-modal service providing route and for transferring information for a comprehensive transportation means, such as a PM vehicle, walking, a personal vehicle, and a public transportation vehicle.

BACKGROUND

The contents described in this section merely provide background information for the present disclosure and do not constitute the related art.

Recently, as a moving means or a transportation means, the proportion of vehicles is decreasing and the proportion of personal mobility vehicles (PM vehicles) is gradually increasing. Here, the PM vehicle refers to a moving object and may be a transportation means including an electric kickboard, a bicycle, a bike, a smart car, a vehicle, a purpose-built vehicle (PBV), an air vehicle, and the like.

As the number of users that utilize PM vehicles increases and the types of PM vehicles become more diverse, the number of users that utilize PM vehicle sharing services and rent and use the PM vehicles for a certain period is also increasing. Even when users do not own PM vehicles, the PM vehicles may be used when necessary, and thus the users may conveniently use the PM vehicles.

As a multi-modal service, the PM vehicle, which is a new transportation means, may be used together with the existing means of transportation, such as personal vehicles, buses, and subways. When routes from departure points to destinations include sections that may not be easily accessed by the existing transportation means, users may easily move to destinations by using the PM vehicles. For example, when users use their personal vehicles and PM vehicles, the users may move to the parking lot around the destination by using their personal vehicles and then quickly and conveniently arrive at the destinations by using the PM vehicles.

However, the users, who currently use the PM vehicles, collect and use information on the existing transportation means and information on the PM vehicles separately. For example, users search for a route using a public transportation means, find positions of PM vehicles, and then the users determine whether to directly use the PM vehicles. Users may not obtain transfer information between the existing transportation means and PM vehicles, and thus it is difficult to smoothly use multi-modal services including the PM vehicles.

Therefore, it is necessary to study a method for providing multi-modal services so that users may use PM vehicles and a general transportation means in a fusion way.

Meanwhile, a global navigation satellite system (GNSS) based on satellite signals is used to determine positions of vehicles. An example of the GNSS may include a global positioning system (GPS). Vehicle to everything (V2X) standard technologies applied to intelligent transportation systems also estimate positions of vehicles based on the GPS.

Therefore, when managing the multi-modal services including the PM vehicles, it is necessary to accurately identify the positions of the PM vehicles.

However, in urban areas with many high-rise buildings, GPS signals are diffusely reflected by high-rise buildings. The GPS diffused reflection may prevent the GPS signals from being transmitted to a destination at a shortest distance and thus reduce the accuracy of positioning. In addition, since it is difficult to receive satellite signals in a GPS dead zone such as an indoor parking lot, it is more difficult to determine the positions of the vehicles.

To solve these problems, additional devices are used in GPS shadow areas or urban areas. In the positioning method using the GPS, in addition to the GPS technology, a map matching technology that displays positions of vehicles as positions on the nearest road may be used. In addition, through an Inertial Navigation System (INS), it is possible to reduce the inaccuracy of the GPS and to receive additional information necessary for positioning in a GPS dead zone. However, even when both the GPS and INS are used, there is a limit to reducing the positioning error because the position is estimated based on the satellite signals transmitted from the satellites.

If a technology for providing signal information to vehicles using the GPS is applied to the PM vehicles, a problem due to a GPS positioning error may be further highlighted. This is because, unlike vehicles that travel only on the road, the PM vehicles can travel along various routes, such as sidewalks, roads, bike roads, or alleys. In other words, when traffic information is provided to the PM vehicles through GPS positioning, there is a problem in that it is difficult to transmit necessary information to the PM vehicles due to a positioning error.

SUMMARY

According to at least one embodiment, the present disclosure provides a method of operating an apparatus for providing a multi-modal service using a personal mobility vehicle (PM vehicle). The method comprises receiving a departure point and a destination from a user terminal. The method also comprises searching for positions of available PM vehicles between the departure point and the destination. The method also comprises generating a route between the departure point and the destination based on the positions of the PM vehicles. The method also comprises providing the route and the positions of the PM vehicles to the user terminal.

According to another embodiment, the present disclosure provides an apparatus for providing a multi-modal service. The apparatus comprises a receiving unit configured to receive a departure point and a destination from a user terminal and a search unit configured to search for positions of available PM vehicles between the departure point and the destination. The apparatus also comprises a generation unit configured to generate a route between the departure point and the destination based on the positions of the PM vehicles. The apparatus also comprises a providing unit configured to provide the route and the positions of the PM vehicles to the user terminal.

DETAILED DESCRIPTION

Figure 1:
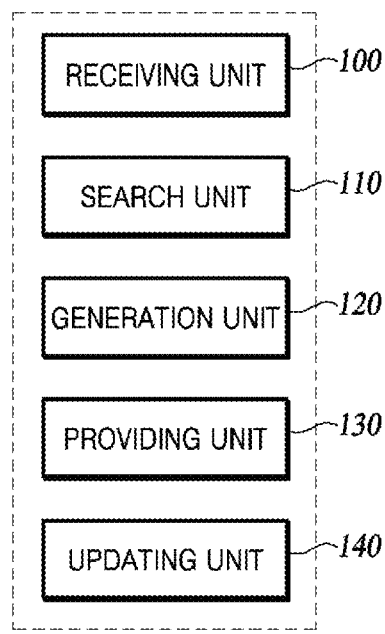
FIG. 1 is a configuration diagram illustrating components of an apparatus for providing a multi-modal service according to an embodiment of the present disclosure.

Embodiments of the present disclosure provide a method and an apparatus for providing a multi-modal service for minimizing a movement time or a movement distance. The method and the apparatus provide an optimal route to a user in consideration of all available transportation means for the user to move from a departure point to a destination, including a personal mobility vehicle (PM vehicle).

Other embodiments of the present disclosure provide a method and an apparatus for providing user convenience and an optimal multi-modal service to a user. The method and the apparatus utilize information on traffic congestion, a reservation system, and user information, or continuously update a route and the transportation means while the user is moving.

Other embodiments of the present disclosure provide a method and an apparatus for providing a multi-modal service for providing an accurate position of a PM vehicle through a plurality of road side units and vehicle to everything (V2X) communication even in a global navigation satellite system (GLASS) dead-zone or an area where diffused reflection of a satellite signal is severe.

Hereinafter, some embodiments of the present disclosure are described with reference to the drawings. It should be noted that in giving reference numerals to components of the accompanying drawings, the same or equivalent components are denoted by the same reference numerals even when the components are illustrated in different drawings. In describing the present disclosure, when determined that a detailed description of related known functions or configurations may obscure the subject matter of the present disclosure, the detailed description thereof has been omitted.

In addition, in describing the components of the present disclosure, terms such as first, second, A, B, (a), (b), etc. may be used. These terms are used only in order to distinguish any component from other components, and features, sequences, or the like, of corresponding components are not limited by these terms. Throughout the present specification, unless explicitly described to the contrary, "including" and "comprising" any components should be understood to imply the inclusion of other elements rather than the exclusion of any other elements. A term, such as "part," "module," or the like described in the specification, means a unit of processing at least one function or operation and may be implemented as hardware or software or a combination of hardware and software. When a component, device, element, or the like of the present disclosure is described as having a purpose or performing an operation, function, or the like, the component, device, or element should be considered herein as being "configured to" meet that purpose or to perform that operation or function.

Hereinafter, a Personal Mobility Vehicle (hereinafter referred to as a PM vehicle) means a moving object or transportation means. Examples of the PM vehicle include a micro mobility vehicle, an electric bicycle, an electric kickboard, an electric scooter, an electric wheelchair, an electric bike, a Segway, a 2-wheel drive vehicle, a smart car, a shuttle, a personal transportation means, a personal flying means, a smart mobility vehicle, a shared mobility vehicle, first mile vehicle, last mile vehicle, a Purpose Built Vehicle (PBV), a personal air vehicle (PAV), a vehicle, an electric vehicle, or the like.

In addition, all road side units (RSUs) may perform broadcasting and may support communication methods, such as unicast and multicast, if necessary. Hereinafter, the RSUs are described on the basis of performing a vehicle to everything (V2X) communication with a personal mobility vehicle (PM vehicle) but are not limited thereto. LTE-V2X, C-V2X, 5G-V2X, wireless access in vehicular environment (WAVE), dedicated short range communication (DSRC), or the like may be used. In other words, communication protocols used in the intelligent transport system (ITS) may be used.

An apparatus for providing a multi-modal service is implemented as a server located outside the PM vehicle but is not limited thereto and may be implemented by an apparatus, a user terminal, or the like located inside the PM vehicle. The apparatus for providing a multi-modal service may store, in advance, at least one of a virtual map, identification information of the RSU, position coordinates corresponding to the identification information of the RSU, identification information of the PM vehicle, or subscriber information of a user. Here, the position coordinates mean latitude and a longitude or mean two-dimensional or three-dimensional coordinates based on a specific point.

FIG. 1 is a configuration diagram illustrating components of an apparatus for providing a multi-modal service according to an embodiment of the present disclosure.

Referring to FIG. 1, an apparatus for providing a multi-modal service (hereinafter a "providing apparatus" 10) includes a receiving unit 100, a search unit 110, a generation unit 120, and a providing unit 130. According to an embodiment of the present disclosure, the providing apparatus 10 may further include an updating unit 140. According to an embodiment of the present disclosure, the providing apparatus 10 may further include a position estimation unit (not illustrated).

The receiving unit 100 is a component that receives a departure point and a destination from a user terminal. The receiving unit 100 according to the embodiment of the present disclosure may further receive reservation information for PM vehicles or identification information of a user from the user terminal.

The search unit 110 is a component that searches for positions of available PM vehicles between the departure point and the destination. The search unit 110 according to the embodiment of the present disclosure may search for the positions of all available PM vehicles between the departure point and destination and search for the positions of the PM vehicles positioned within a predetermined distance from a straight route between the departure point and the destination.

According to an embodiment of the present disclosure, the search unit 110 may re-search for the positions of the PM vehicles positioned between a current position of the user terminal and the destination while the user terminal is moving. The position of the user terminal is periodically estimated while the user terminal is moving. The most recently estimated position is the current position of the user terminal. When situations in which traffic becomes congested or the available PM vehicles position are unavailable occur while the user terminal is moving along the route generated by the generation unit 120, the search unit 110 may continuously re-search for an optimal route according to a change in situations.

The generation unit 120 is a component that generates a route between a departure point and a destination based on the positions of the PM vehicles. Here, the route includes at least one of a PM vehicle route along which a user moves by using a PM vehicle, a sidewalk along which a user walks, or a general route through which the user moves using a general transportation means. The generation unit 120 generates a route based on the position of the PM vehicle and a transfer point of the general transportation means. In addition, the generation unit 120 may generate a route selected by a user out of a shortest-distance route or a shortest-time route.

According to an embodiment of the present disclosure, when there is a PM vehicle selected by a user, the generation unit 120 may generate a route for moving to a destination by using the selected PM vehicle.

According to an embodiment of the present disclosure, the generation unit 120 may calculate a traffic congestion degree of a route and generate at least one of the shortest-time route or the shortest-distance route based on the traffic congestion degree. In other words, the route may be generated after excluding the congested route among routes along which a PM vehicle may move or a general transportation means may move.

According to an embodiment of the present disclosure, the generation unit 120 may generate a route further on the basis of the reservation information received by the receiving unit 100 from the user terminal. Here, the reservation information means information, such as identification information, a usage time, and a destination of a PM vehicle that a user intends to use. When one user reserves a PM vehicle, other users may not use the reserved PM vehicle.

According to an embodiment of the present disclosure, the receiving unit 100 receives identification information for a specific PM vehicle from the user terminal. The generation unit 120 may generate a route further based on at least one of preference by transportation means, preference by PM vehicle type, PM vehicle usage information, age, or gender corresponding to the identification information. For example, the generation unit 120 may preferentially generate a route using an electric scooter rather than an electric kickboard. In addition, the generation unit 120 may preferentially generate a route using an easy-to-manipulate PM vehicle according to age or gender. Also, the generation unit 120 may preferentially generate a route using an alley over a route using a road according to PM vehicle usage information of a user.

The providing unit 130 is a component that provides a route and positions of PM vehicles to a user. The providing unit 130 provides the user with the positions of the PM vehicles searched by the search unit 110 and provides the user with the route generated by the generation unit 120. The providing unit 130 may provide the positions of the PM vehicles and the route simultaneously or separately.

According to an embodiment of the present disclosure, the providing unit 130 may perform mapping the positions, types, and routes of the PM vehicles to the virtual map and provide the mapped virtual map to the user. This is to enable a user to conveniently use the multi-modal service.

According to an embodiment of the present disclosure, the providing unit 130 may provide the user with the route updated according to the search unit 110 and the updating unit 140 and the positions of the re-searched PM vehicles.

The updating unit 140 is a component that updates the route using the search unit 110 based on the re-searched positions of the PM vehicles while the user terminal is moving. When a user moves along a route by the generation unit 120, the updating unit 140 takes into consideration a traffic congestion degree, positions of PM vehicles, availability of PM vehicles, etc. to update the existing route when there is a route that has a shorter distance or takes less time than the existing route.

Hereinafter, a process in which the providing apparatus 10 searches for the position of the PM vehicle through V2X communication is described.

According to an embodiment of the present disclosure, the receiving unit 100 may receive, from a plurality of PM vehicles, V2X messages received by the plurality of PM vehicles from a plurality of RSUs. Specifically, the receiving unit 100 may receive, from the PM vehicle, V2X messages received by the PM vehicle from at least three RSUs. The V2X messages are used to estimate the position of the PM vehicle by the position estimation unit.

The position estimation unit 106 is a component that estimates the positions of the plurality of PM vehicles based on the V2X messages and the position coordinates pre-stored for the plurality of RSUs. Specifically, the position estimation unit 106 may calculate at least one of a received signal strength indicator (RSSI), a round trip time (RTT), a time of flight (ToF), a time of arrival (ToA), or a time difference of arrival (TDoA) of the V2X message. The position estimation unit may measure a distance between the RSU and the PM vehicle based on at least one of the RSSI, RTT, ToF, ToA, or TDoA of the V2X message. The position estimation unit may estimate the position of the PM vehicle by applying triangulation to the distance between at least three RSUs and the PM vehicle.

Figure 2A:
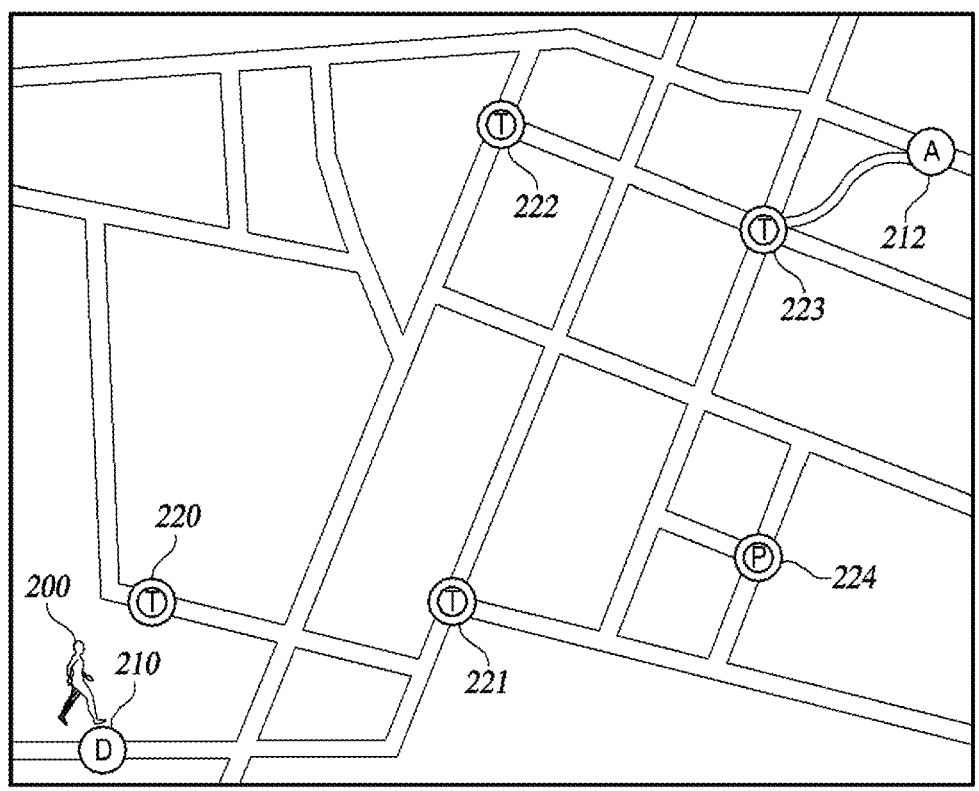
FIGS. 2A, 2B, and 2C are diagrams illustrating a method of operating an apparatus for providing a multi-modal service according to an embodiment of the present disclosure.
Figure 2B:
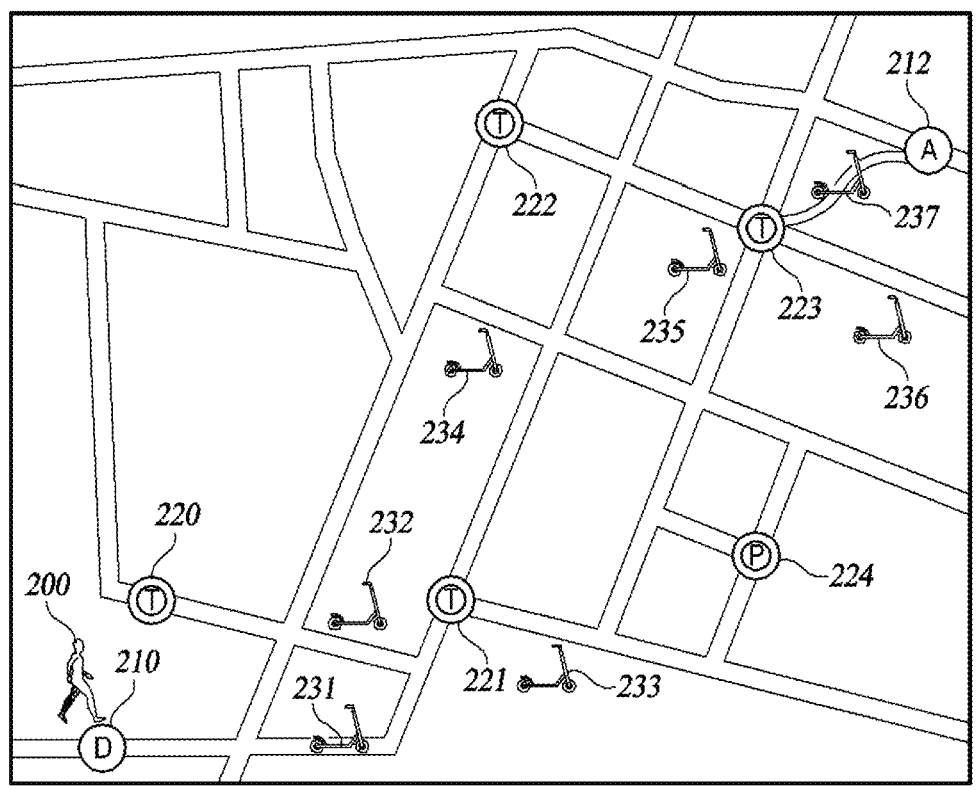
Figure 2C:
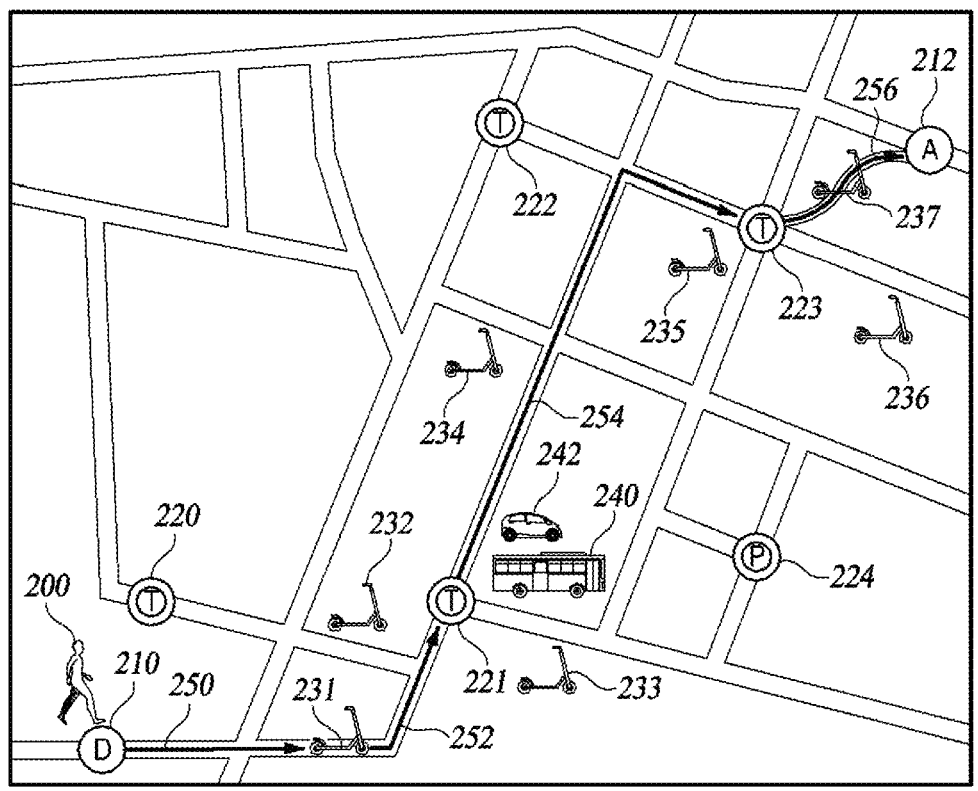

FIGS. 2A, 2B, and 2C are diagrams illustrating a method of operating an apparatus for providing a multi-modal service according to an embodiment of the present disclosure.

Referring to FIGS. 2A, 2B, and 2C, a user 200, a departure point 210, a destination 212, a plurality of transfer points 220, 221, 222, and 223, a parking lot 224, PM vehicles 231, 232, 233, 234, 235, 236, and 237, a plurality of general transportation means 240 and 242, and routes 250, 252, 254, and 256 are illustrated. In FIGS. 2B and 2C, the PM vehicles 231, 232, 233, 234, 235, 236, and 237 are all expressed as a kickboard, but this is only one embodiment, and the PM vehicles may be implemented as any above-described type of PM vehicle.

Hereinafter, the user 200 may mean a user terminal. The plurality of general transportation means are referred to as a bus 240 and a personal vehicle 242. The plurality of transfer points 220, 221, 222, and 223 may be points at which the user 200 may transfer, such as a bus stop, a taxi stop, a parking lot, and a PM vehicle parking lot. The routes are referred to a sidewalk 250, a first PM vehicle route 252, a general route 254, and a second PM vehicle route 256.

In FIG. 2A, the providing apparatus receives the departure point 210 and the destination 212 from the user 200. In FIG. 2B, the providing apparatus searches for positions of the PM vehicles 231, 232, 233, 234, 235, 236, and 237 available to the user 200 between the departure point 210 and the destination 212.

In FIG. 2C, the providing apparatus generates routes 250, 252, 254, and 256 between the departure point 210 and the destination 212 based on the positions of the PM vehicles 231, 232, 233, 234, 235, 236, and 237. The routes 250, 252, 254, and 256 include the sidewalk 250, the first PM vehicle route 252, the general route 254, and the second PM vehicle route 256. Also, the routes 250, 252, 254, and 256 include routes along which the PM vehicle may move among routes along which the general transportation means may not travel. However, this can be just an example, and it is sufficient that the routes 250, 252, 254, and 256 include at least one of a sidewalk, a PM vehicle route, or a general route. However, the route should be a route along which the user 200 may move to the destination 212 in the shortest distance or in the shortest time.

The providing apparatus provides the user 200 with the routes 250, 252, 254, and 256 and positions of the PM vehicles 231, 232, 233, 234, 235, 236, and 237. The user 200 may use a multi-modal service to the destination 212 based on the routes 250, 252, 254, and 256 and the positions of the PM vehicles 231, 232, 233, 234, 235, 236, and 237.

The user 200 may walk to the first PM vehicle 231 and move to the first transfer point 221 using the first PM vehicle 231. At the first transfer point 221, the user 200 may move to the second transfer point 223 using one of the plurality of general transportation means 240 and 242. The first transfer point 221 and the second transfer point 223 become a bus stop when the user 200 uses the bus 240 and become a parking lot when the user 200 uses the personal vehicle 242. The user 200 may walk from the second transfer point 223 to the position of the second PM vehicle 237 and arrive at the destination 212 using the second PM vehicle 237.

Figure 3A:
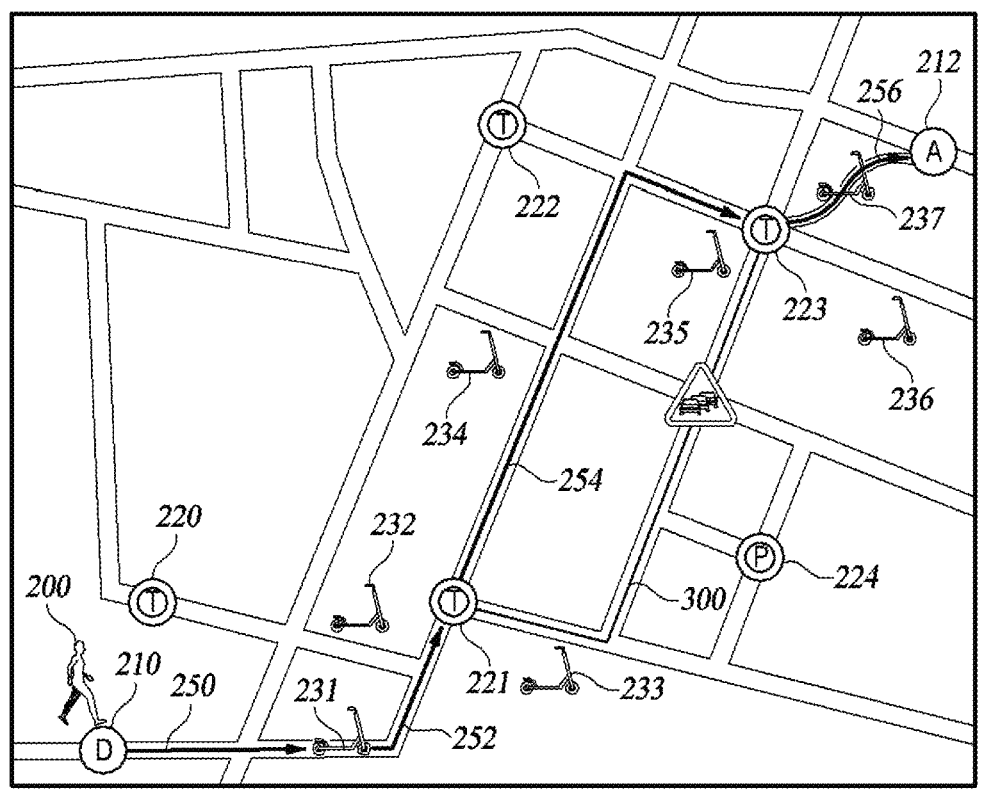
FIGS. 3A and 3B are diagrams for describing a method of providing a multi-modal service to which a traffic congestion degree and real-time update are applied according to an embodiment of the present disclosure.
Figure 3B:
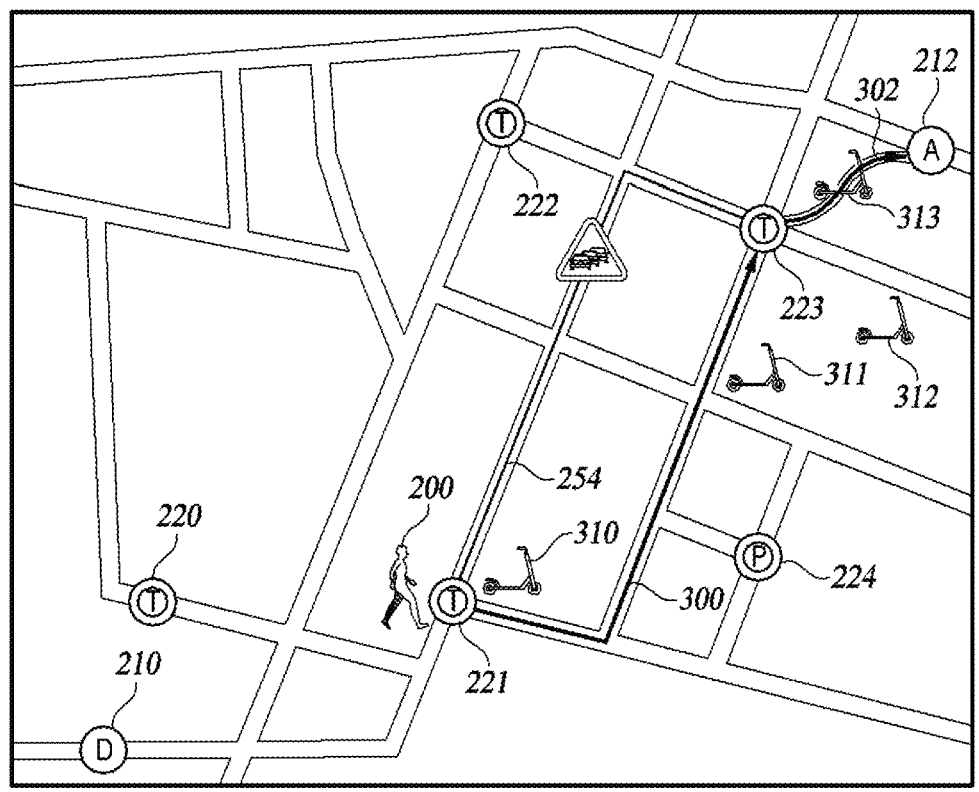

FIGS. 3A and 3B are diagrams for describing a method of providing a multi-modal service to which traffic congestion and real-time update are applied according to an embodiment of the present disclosure.

Referring to FIG. 3A, the user 200, the departure point 210, the destination 212, the plurality of transfer points 220, 221, 222, and 223, the parking lot 224, the PM vehicles 231, 232, 233, 234, 235, 236, and 237, the plurality of general transportation means 240 and 242, and the routes 250, 252, 254, 256 and 300 are illustrated. Some of the routes are referred to the first route 254 and the second route 300. The first route 254 is the same as the general route 254 generated in FIG. 2C.

According to an embodiment of the present disclosure, the providing apparatus may calculate a traffic congestion degree of several routes and generate an optimal route based on the traffic congestion degree.

In FIG. 3A, as a route through which the user 200 may move from the first transfer point 221 to the second transfer point 225, there are the first route 254 and the second route 300. As an embodiment, the first route 254 is a general route and the second route 300 is described as a PM vehicle route.

The providing apparatus compares the time or a distance that the user 200 takes to move to the destination 212 using the first route 254 and the time or distance that the user 200 takes to move to the destination 212 using the second route 300. In FIG. 3A, when it is determined that the second route 300 is congested with other vehicles, the providing apparatus may generate the route including the first route 254 instead of the second route 300.

On the other hand, referring to FIG. 3B, the user 200, the departure point 210, the destination 212, the plurality of transfer points 220, 221, 222, and 223, the parking lot 224, the re-searched PM vehicles 310, 311, 312, and 313, the updated routes 300 and 302, and the first route 254 are illustrated. One of the updated routes is referred to the second route 300. The first route 254 is the existing general route and the second route 300 is an updated PM vehicle route.

As illustrated in FIG. 3B, the providing apparatus may update the route while the user 200 is moving. Considering that positions of PM vehicles change, the PM vehicles become unavailable, or a congested route changes while the user 200 is moving, the providing apparatus may provide a user with an optimal route updated in real time.

Specifically, the providing apparatus re-searches for available PM vehicles between a current position of the user 200 and the destination 212. In this case, the providing apparatus estimates a current position of the user 200. The providing apparatus may re-search for PM vehicles according to a predetermined period or may re-search for PM vehicles at a transfer point or according to the request of the user 200.

Thereafter, the providing apparatus may update the route based on the positions of the re-searched PM vehicles 310, 311, 312, and 313. Similarly, the providing apparatus may update the route in consideration of a traffic congestion degree, reservation information, preference by transportation means, preference by PM vehicle type, PM vehicle usage information, age, gender, or the like. For example, in FIG. 3B, when the user 200 arrives at the first transfer point 221, if the first route 254 is more congested than the second route 300, the providing apparatus may update the route to include the second route 300.

Even when other variable factors occur while the user 200 is moving, the user 200 may move to the destination 212 in the shortest distance or in the shortest time through the real-time update of the route.

Figure 4A:
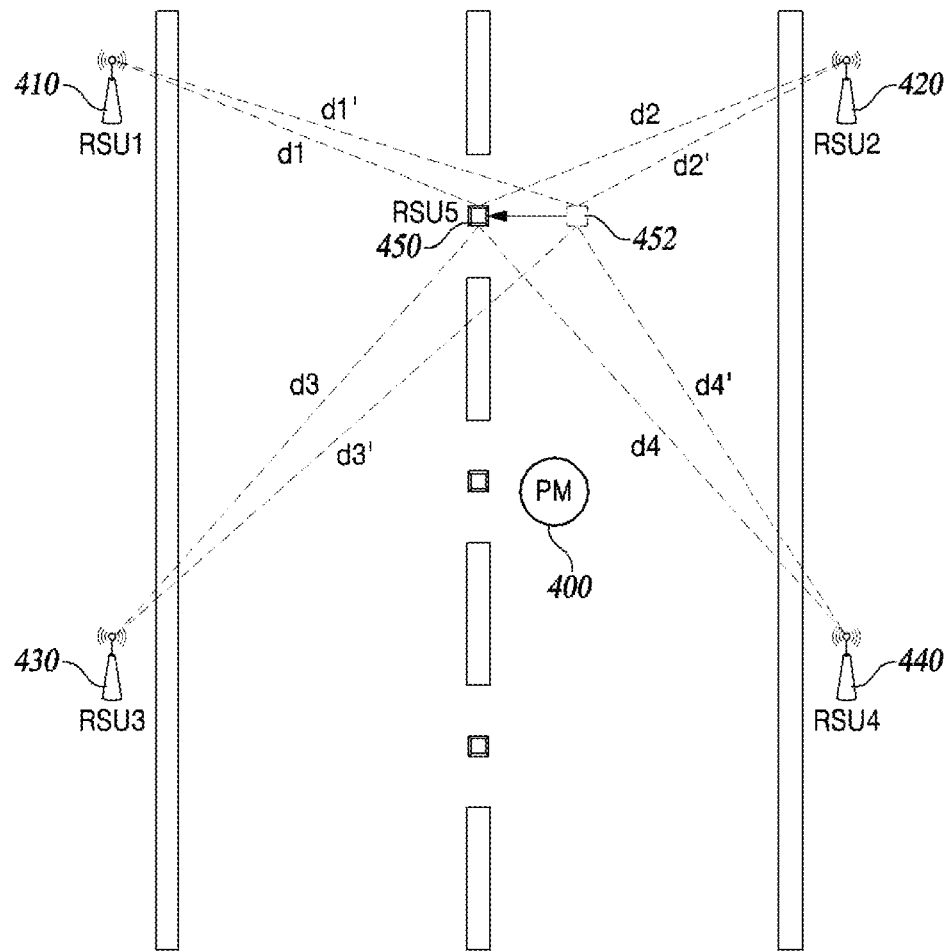
FIGS. 4A and 4B are diagrams for describing a process of estimating an accurate position of a personal mobility vehicle (PM vehicle) according to an embodiment of the present disclosure.
Figure 4B:
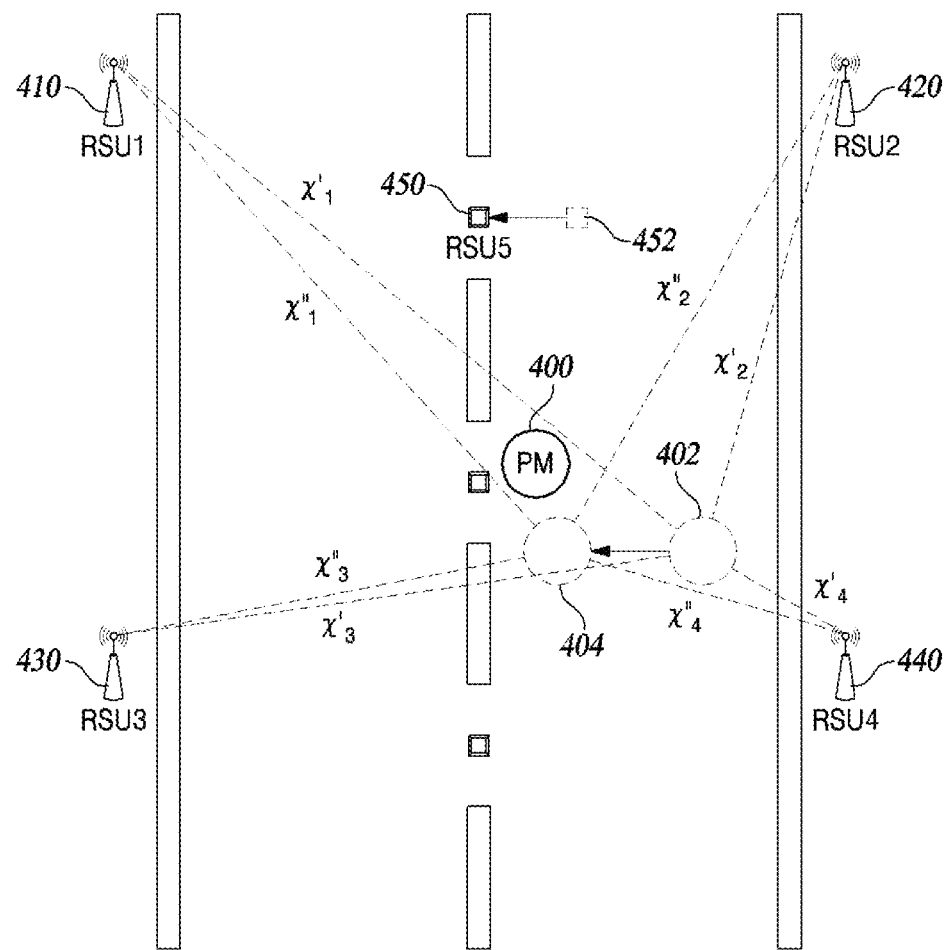

FIGS. 4A and 4B are diagrams for describing a process of estimating an accurate position of a PM vehicle according to an embodiment of the present disclosure.

In detail, FIG. 4A is a diagram for describing a process of generating correction data. FIG. 4B is a diagram for describing a process of correcting the candidate position of the PM vehicle based on the correction data.

Referring to FIG. 4A, an actual position 400 of a PM vehicle, a plurality of RSUs 410, 420, 430, 440, and 450, and an estimated position 452 of a fifth RSU are illustrated. The plurality of RSUs are referred to the auxiliary RSUs 410, 420, 430, and 440 and the fifth RSU 450. The auxiliary RSUs are referred to the first RSU 410, the second RSU 420, the third RSU 430, and the fourth RSU 440. FIG. 4B additionally illustrates an estimated position 402 of the PM vehicle and a corrected position 404 of the PM vehicle.

Hereinafter, the fifth RSU 450 is described as a reference RSU for correction of the estimated position, but this is only one embodiment. The reference RSU may be implemented by at least one of the first RSU 410, the second RSU 420, the third RSU 430, or the fourth RSU 440. Meanwhile, the auxiliary RSUs 410, 420, 430, and 440 are only an embodiment and may be constituted as at least three of the auxiliary RSUs. Position coordinates for the plurality of RSUs 410, 420, 430, 440, and 450 are assumed to be known in advance.

Hereinafter, it is described that the providing apparatus generates correction data. However, the correction data can be generated by another device or the reference RSU. At this time, the reference RSU may be set to store and transmit the correction data.

The fifth RSU 450 receives messages from the auxiliary RSUs 410, 420, 430, and 440. The providing apparatus calculates the distances between the fifth RSU 450 and the auxiliary RSUs 410, 420, 430, 440 based on at least one of the RSSI and the ToF of the messages received by the fifth RSU 450 or the positions of the auxiliary RSUs 410, 420, 430, and 440. At this time, the known positions of the auxiliary RSUs 410, 420, 430, and 440 are utilized.

Based on the distances between the fifth RSU 450 and the auxiliary RSUs 410, 420, 430, and 440, the providing apparatus may derive the estimated position 452 of the fifth RSU.

However, the actual position and the estimated position 452 of the fifth RSU may not be matched due to a signal distortion by weather or obstacles, errors in the RSU, and the like. By obtaining, however, an error between the known actual position and the estimated position 452 of the fifth RSU and using the previously obtained error as the positioning correction data of the PM vehicle, the providing apparatus can accurately derive the actual position 400 of the PM vehicle.

In particular, the providing apparatus may accurately derive the actual position 400 of the PM vehicle using correction data including any one of a distance error ratio, a distance error, or a position error of the fifth RSU 450.

Hereinafter, a process of generating correction data in the order of a distance error ratio, a distance error, and a position error, and correcting the position of the PM vehicle using the correction data is described.

As a first embodiment, in order to use the distance error ratio, the providing apparatus calculates a distance $d_1'$ between the estimated position 452 of the fifth RSU 450 and the position of the first RSU 410 based on at least one of the RSSI or the ToF of the messages received by the fifth RSU 450. The providing apparatus further calculates a distance $d_1$ between the actual position of the fifth RSU 450 and the position of the first RSU 410.

The providing apparatus calculates an error ratio (hereinafter, a first distance error ratio) between $d_1$ and $d_1'$. Here, the distance error ratio means the ratio of the actual distance to the estimated distance. In other words, the distance error ratios are the actual distances over the estimated distances. For example, the first distance error ratio means a ratio of $d_1$ to $d_1'$. Additionally, the providing apparatus calculates each of a second distance error ratio, a third distance error ratio, and a fourth distance error ratio for the second RSU 420, the third RSU 430, and the fourth RSU 440, respectively.

Referring to FIG. 4B, the providing apparatus may derive the corrected position 404 of the PM vehicle by correcting the estimated position 402 of the PM vehicle using the distance error ratio.

Specifically, the PM vehicle receives messages from the auxiliary RSUs 410, 420, 430, and 440. The providing apparatus may estimate the estimated position 402 of the PM vehicle based on at least one of the RSSI or the ToF of the messages received by the PM vehicle. In detail, the providing apparatus calculates the estimated position 402 of the PM vehicle through the triangulation or the trilateration based on at least three positions of the auxiliary RSUs 410, 420, 430, or 440, and the RSSI or the ToF of the messages received from three RSUs.

The providing apparatus obtains the distances between the estimated position 402 of the PM vehicle and the positions of the auxiliary RSUs 410, 420, 430, and 440. The distances from the estimated position 402 of the PM vehicle to the positions of the auxiliary RSUs 410, 420, 430, and 440 are x1', x2', x3', and x4', respectively.

Thereafter, the providing apparatus may calculate the distance error ratios that are the correction data. The distance error ratios mean distance error ratios from the fifth RSU 450 to the auxiliary RSUs 410, 420, 430, and 440.

The providing apparatus may obtain the corrected distances by multiplying the distance error ratio by the distances between the estimated position 402 of the PM vehicle and the positions of the auxiliary RSUs 410, 420, 430, and 440. For example, the providing apparatus may obtain x1" by multiplying $(d_1/d_1')$ by x1'. Additionally, the providing apparatus may further obtain x2", x3", and x4".

The corrected distances from the estimated position 402 of the PM vehicle to the positions of the auxiliary RSUs 410, 420, 430, and 440 may be expressed as in Equation 1.

$$x'' = x' \times \frac{d}{d'} \quad \text{[Equation 1]}$$

In Equation 1, x" denotes the corrected distance from the estimated position 402 of the PM vehicle to the positions of the auxiliary RSUs 410, 420, 430, and 440. Also, x' denotes the distance from the estimated position 402 of the PM vehicle to the auxiliary RSUs 410, 420, 430, and 440. Further, d denotes the distance from the actual position of the fifth RSU 450 to the positions of the auxiliary RSUs 410, 420, 430, and 440. Lastly, d' denotes the distance from the estimated position 452 of the fifth RSU to the positions of the auxiliary RSUs 410, 420, 430, and 440.

The providing apparatus may calculate the corrected position 404 of the PM vehicle through the triangulation or the trilateration based on at least three of x1", x2", x3", or x4". Since the error between the actual distance and the estimated distance from the fifth RSU 450 to the auxiliary RSUs 410, 420, 430, and 440 is reflected in the estimated position 402 of the PM vehicle, the corrected position 404 of the PM vehicle is derived to be closer to the actual position 400 of the PM vehicle than the estimated position 402 of the PM vehicle.

The providing apparatus according to the embodiment of the present disclosure may correct the estimated position 402 of the PM vehicle using the error ratio for one of the RSSI or the ToF instead of the distance.

As a second embodiment, the providing apparatus may calculate the distance errors as the correction data. The distance errors mean distance errors between the fifth RSU 450 and the auxiliary RSUs 410, 420, 430, and 440.

In order to use the distance error, the providing apparatus calculates an error (hereinafter, a first distance error) between $d_1$ and $d_1'$. Specifically, the first distance error means a value obtained by subtracting $d_1'$ from $d_1$. Additionally, the providing apparatus calculates each of the second distance error, the third distance error, and the fourth distance error for the second RSU 420, the third RSU 430, and the fourth RSU 440.

Referring to FIG. 4B, the providing apparatus may derive the corrected position 404 of the PM vehicle by correcting the estimated position 402 of the PM vehicle using the distance error.

Specifically, the PM vehicle receives messages from the auxiliary RSUs 410, 420, 430, and 440. The providing apparatus may estimate the estimated position 402 of the PM vehicle based on at least one of the RSSI or the ToF of the messages by the PM vehicle. In detail, the providing apparatus calculates the estimated position 402 of the PM vehicle through the triangulation or trilateration based on at least three positions of the auxiliary RSUs 410, 420, 430, or 440, and the RSSI or the ToF of the messages received from three RSUs. In this case, the distances between the estimated position 402 of the PM vehicle and the positions of the auxiliary RSUs 410, 420, 430, and 440 are x1', x2', x3', and x4', respectively.

The providing apparatus may obtain the respective corrected distances by adding the distance error to the distances from the estimated position 402 of the PM vehicle to the positions of the auxiliary RSUs 410, 420, 430, and 440. For example, the providing apparatus may obtain x1" by adding $(d_1-d_1')$ to x1'. Additionally, the providing apparatus may further obtain x2", x3", and x4".

The distances from the estimated position 402 of the PM vehicle to the positions of the auxiliary RSUs 410, 420, 430, and 440 may be expressed as in Equation 2.

$$x''=x'+(d-d') \quad \text{[Equation 2]}$$

The providing apparatus may calculate the corrected position 404 of the PM vehicle through the triangulation or trilateration based on at least three of x1", x2", x3", or x4". Since the error between the actual distance and the estimated distance from the fifth RSU 450 to the auxiliary RSUs 410, 420, 430, and 440 is reflected in the estimated position 402 of the PM vehicle, the corrected position 404 of the PM vehicle may be closer to the actual position 400 of the PM vehicle than the estimated position 402 of the PM vehicle.

The providing apparatus according to the embodiment of the present disclosure may correct the estimated position 402 of the PM vehicle using the error ratio for one of the RSSI or the ToF instead of the distance.

As a third embodiment, the providing apparatus may calculate the position errors as the correction data. The position error means a difference between the estimated position 452 and the actual position of the fifth RSU 450. Otherwise, the providing apparatus calculates a position error meaning the difference between the actual position of the fifth RSU 450 and the estimated position 452 of the fifth RSU. Here, the position may mean two-dimensional position coordinates or three-dimensional position coordinates. The position error is calculated by calculations for each dimension.

After estimating the estimated position 402 of the PM vehicle, the providing apparatus may derive the corrected position 404 of the PM vehicle by correcting the estimated position 402 of the PM vehicle based on the position error for the fifth RSU 450. Specifically, each of the corrections may be performed by dividing the estimated position 402 of the PM vehicle into an x coordinate and a y coordinate.

Meanwhile, the providing apparatus may receive the distance error ratio, the distance error, and the position error between the fifth RSU 450 and the auxiliary RSUs 410, 420, 430, and 440 in real time or may calculate and store, in advance, the distance error ratio, the distance error, and the position error.

Through the above-described three error corrections, the providing apparatus may derive the accurate position of the PM vehicle.

Figure 5:
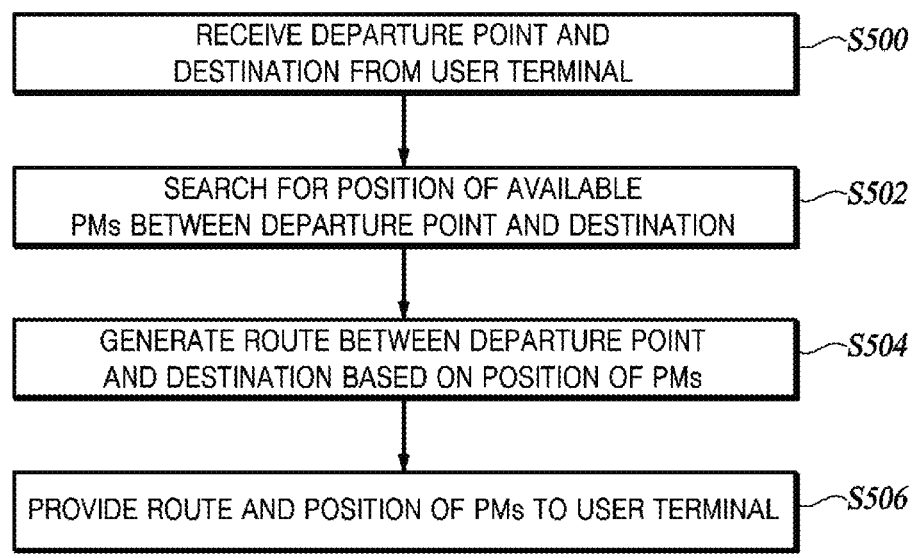
FIG. 5 is a flowchart for describing a method of operating an apparatus for providing a multi-modal service according to an embodiment of the present disclosure.

FIG. 5 is a flowchart for describing a method of operating an apparatus for providing a multi-modal service according to an embodiment of the present disclosure.

Referring to FIG. 5, the providing apparatus receives a departure point and a destination from the user terminal (S500). According to an embodiment of the present disclosure, the providing apparatus may receive reservation information or identification information for PM vehicles from the user terminal. The identification information is received in order to use at least one of preference by transportation means, preference by PM vehicle type, PM vehicle usage information, age, or gender corresponding to the identification information. At least one of the preference by transportation means, the preference by PM vehicle type, the PM vehicle usage information, the age, or the gender corresponding to the identification information may be stored in advance or collected in real time.

The providing apparatus searches for positions of available PM vehicles between the departure point and destination (S502).

The providing apparatus generates a route between the departure point and the destination based on the positions of the PM vehicles (S504). Here, the route includes at least one of a PM vehicle route along which a user moves by using a PM vehicle, a sidewalk along which a user walks, or a general route through which the user moves using a general transportation means. In addition, the route includes a route selected by a user out of a route according to a shortest time or a route according to a shortest distance.

According to an embodiment of the present disclosure, the providing apparatus may generate at least one of a shortest-time route or a shortest-distance route based on at least one of the traffic congestion degree, the reservation information, the preference by transportation means, the preference by PM vehicle type, the PM vehicle usage information, the age, or the gender.

The providing apparatus provides the route and the positions of the PM vehicles to the user (S506). According to an embodiment of the present disclosure, the providing apparatus may perform mapping the positions, types, and routes of the PM vehicles to the virtual map and provide the mapped virtual map to the user.

According to an embodiment of the present disclosure, the providing apparatus may re-search for the positions of the PM vehicles positioned between the current position of the user terminal and the destination while the user terminal is moving. The providing apparatus may update the route based on the positions of the re-searched PM vehicles and may provide the updated route and the positions of the re-searched PM vehicles to the user.

Although it is described in FIG. 5 that operations S500 to S506 are sequentially executed, this merely illustrates the technical idea of an embodiment of the present disclosure. In other words, those having ordinary skill in the technical field to which an embodiment of the present disclosure belongs may change the order described in FIG. 5 within a range that does not deviate from the essential characteristics of an embodiment of the present disclosure. Alternatively, those having ordinary skill in the technical field may apply various modifications and variations to execute one or more of the operations S500 to S506 in parallel. Thus, FIG. 5 is not limited to a time-series order. The above modifications and variations should be within the scope of the present disclosure.

Meanwhile, the operations illustrated in FIG. 5, as well as the apparatus including the various units identified above and in FIG. 1, can be implemented as computer-readable codes on a computer-readable recording medium. The computer readable recording medium may include all kinds of recording apparatuses in which data that may be read by a computer system is stored. In other words, the computer-readable recording medium may be a non-transitory medium, such as a read-only memory (ROM), a randomaccess memory (RAM), a compact disc (CD)-ROM, a magnetic tape, a floppy disk, and an optical data storage device. The computer readable recording medium may further include a transitory medium such as a carrier wave (for example, transmission over the Internet) and a data transmission medium. In addition, the computer readable recording media may be distributed in computer systems connected to each other through a network such that the computer readable codes may be stored and executed in the computer readable recording media in a distributed scheme.

In addition, components of the present disclosure may use an integrated circuit structure, such as a memory, a processor, a logic circuit, a look-up table, and the like. These integrated circuit structures execute each of the functions described herein through the control of one or more microprocessors or other control devices. In addition, components of the present disclosure may be specifically implemented by a program or a portion of a code that includes one or more executable instructions for performing a specific logical function and is executed by one or more microprocessors or other control devices. In addition, components of the present disclosure may include or be implemented as a Central Processing Unit (CPU), a microprocessor, and the like that performs respective functions. In addition, components of the present disclosure may store instructions executed by one or more processors in one or more memories.

Although embodiments of the present disclosure have been described for illustrative purposes, those having ordinary skill in the art should appreciate that various modifications, additions, and substitutions are possible, without departing from the idea and scope of the present disclosure. Therefore, embodiments of the present disclosure have been described for the sake of brevity and clarity. The scope of the technical idea of the present embodiments is not limited by the illustrations. Accordingly, those having ordinary skill should understand the scope of the present disclosure should not be limited by the above explicitly described embodiments but by the claims and equivalents thereof.

As described above, according to the embodiment of the present disclosure, it is possible to minimize a movement time or a movement distance by providing an optimal route to a user in consideration of all available transportation means including a PM vehicle for the user to move from a departure point to a destination.

According to another embodiment of the present disclosure, it is possible to promote user convenience and provide an optimal multi-modal service to a user by utilizing information on traffic congestion, a reservation system, and a user, or continuously updating a route and a transportation means while the user is moving.

According to another embodiment of the present disclosure, it is possible to provide a multi-modal service for providing an accurate position of a PM vehicle through a plurality of RSUs and V2X communication even in a GNSS dead-zone or an area where diffused reflection of a satellite signal is severe.

What is claimed is:

1. A method, implemented by at least one memory and at least one processor, of operating an apparatus for providing a multi-modal service using a personal mobility vehicle (PM vehicle), the method comprising:
   receiving a departure point and a destination from a user terminal;
   searching for positions of PM vehicles between the departure point and the destination;
   generating a route between the departure point and the destination based on the positions of the PM vehicles; and
   providing the route and the positions of the PM vehicles to the user terminal,
   wherein searching for the positions of the PM vehicles includes:
      estimating a candidate position of a PM vehicle based on messages transmitted from a plurality of auxiliary road side units around the PM vehicle to the PM vehicle; and
      correcting the candidate position of the PM vehicle based on correction data,
   wherein the correction data is any one of distance error ratios being ratios of actual distances to estimated distances between a reference road side unit and the plurality of auxiliary road side units, or distance errors being differences between the actual distances and the estimated distances,
   wherein the actual distances are based on known positions of the reference road side unit and the plurality of auxiliary road side units, and
   wherein the estimated distances are based on messages between the reference road side unit and the plurality of auxiliary road side units.

2. The method of claim 1, wherein the route includes a route selected by a user out of a route according to a shortest time or a route according to a shortest distance.

3. The method of claim 1, wherein the generating of the route includes:
   calculating a traffic congestion degree of the route; and
   generating at least one of a shortest-time route or a shortest-distance route based on the traffic congestion degree.

4. The method of claim 1, wherein the generating of the route includes:
   providing the positions of the PM vehicles to the user terminal;
   receiving reservation information for the PM vehicles from the user terminal; and
   generating the route based on the reservation information.

5. The method of claim 1, wherein the generating of the route includes:
   receiving identification information from the user terminal; and
   generating the route based on at least one of preference by transportation means, preference by PM vehicle types, PM vehicle usage information, age, or gender corresponding to the identification information.

6. The method of claim 1, wherein the providing includes:
   mapping at least one of the positions, types, or routes of the PM vehicles to a virtual map; and
   providing the virtual map to the user terminal.

7. An apparatus for providing a multi-modal service, the apparatus comprising:
   at least one memory storing computer-executable instructions; and
   at least one processor, wherein the at least one processor is configured to execute the computer-executable instructions to:
      receive a departure point and a destination from a user terminal,
      search for positions of PM vehicles between the departure point and the destination,
      generate a route between the departure point and the destination based on the positions of the PM vehicles, and provide the route and the positions of the PM vehicles to the user terminal, wherein the at least one processor is configured to:

estimate a candidate position of a PM vehicle based on messages transmitted from a plurality of auxiliary road side units around the PM vehicle to the PM vehicle; and correct the candidate position of the PM vehicle based on a correction data, wherein the correction data is any one of distance error ratios being ratios of actual distances to estimated distances between a reference road side unit and the plurality of auxiliary road side units, or distance errors between being differences between the actual distances and the estimated distances, wherein the actual distances are based on known positions of the reference road side unit and the plurality of auxiliary road side units, and wherein the estimated distances are based on messages between the reference road side unit and the plurality of auxiliary road side units.

8. The apparatus of claim 7, wherein the route includes a route selected by a user out of a route according to a shortest time or a route according to a shortest distance.

9. The apparatus of claim 7, wherein the at least one processor is further configured to calculate a traffic congestion degree of the route and generate at least one of a shortest-time route or a shortest-distance route based on the traffic congestion degree.

10. The apparatus of claim 7, wherein the at least one processor is further configured to receive reservation information for the PM vehicles from the user terminal, and wherein the at least one processor is further configured to generate the route based on the reservation information.

11. The apparatus of claim 7, wherein the at least one processor is further configured to receive identification information from the user terminal, and wherein the at least one processor is further configured to generate the route based on at least one of preference by transportation means, preference by PM vehicle types, PM vehicle usage information, age, or gender corresponding to the identification information.

12. The apparatus of claim 7, wherein the at least one processor is configured to perform mapping at least one of the positions, types, or routes of the PM vehicles to a virtual map and provide the virtual map to the user terminal.

* * * * *